Patented Apr. 2, 1929.

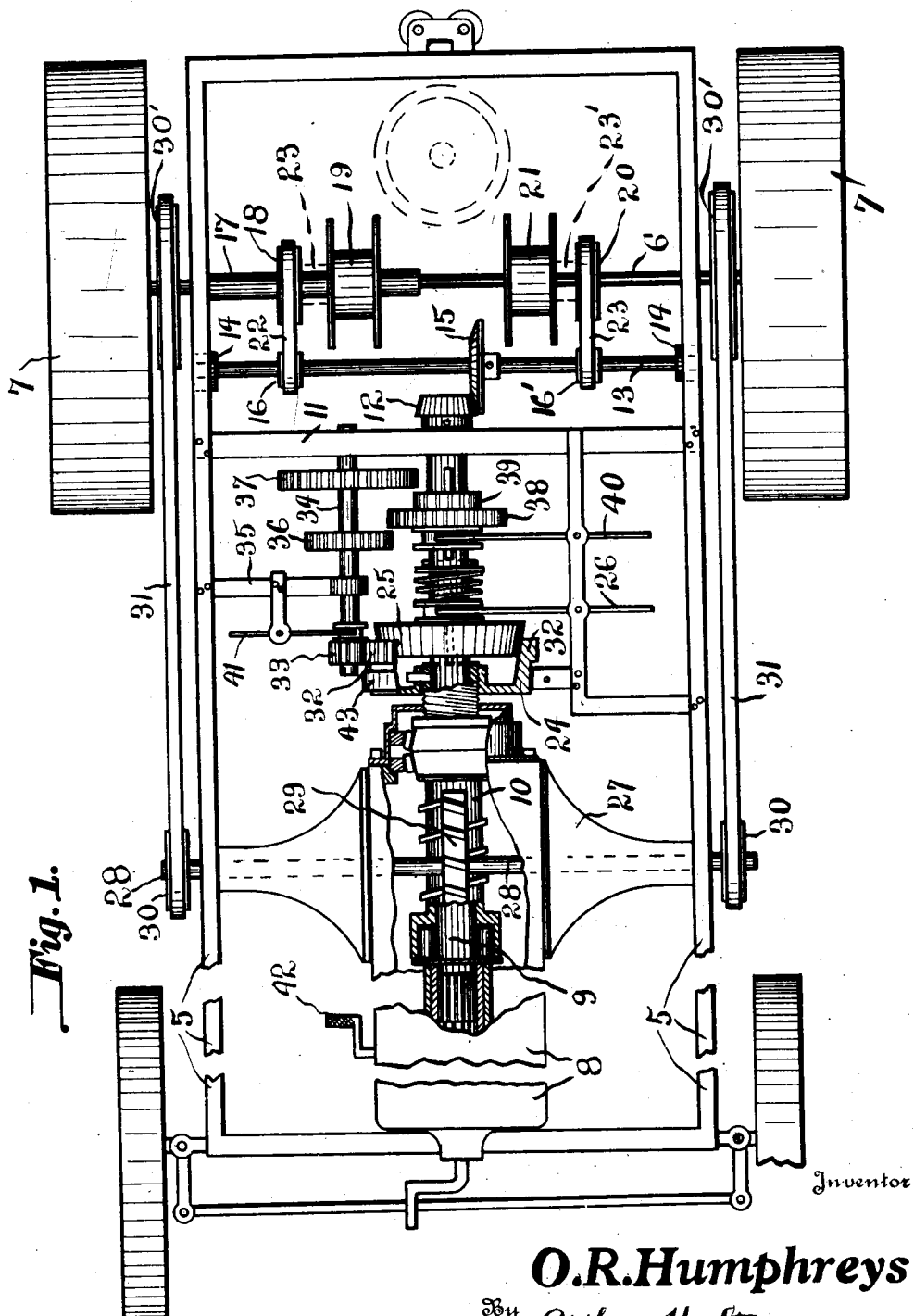

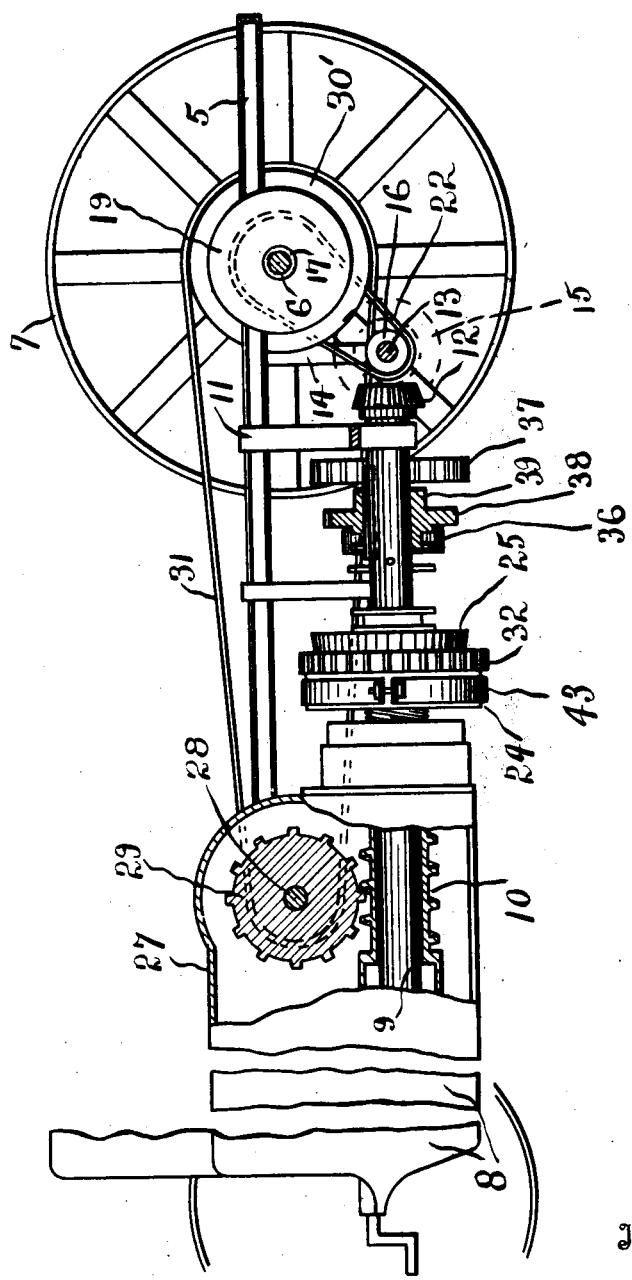

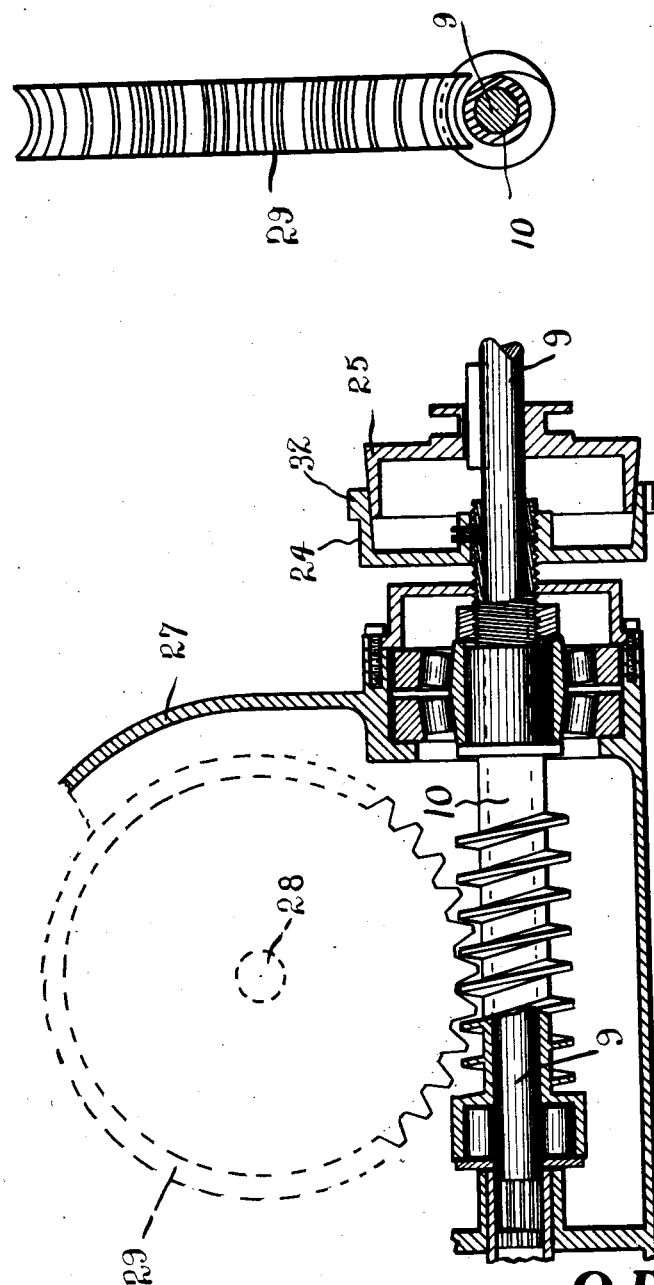

1,707,724

UNITED STATES PATENT OFFICE.

OMAR R. HUMPHREYS, OF OMAHA, NEBRASKA.

WORM GEARING.

Application filed May 13, 1926. Serial No. 108,781.

This invention relates to interchangeable power mechanism for use on tractors or other heavy motor-driven vehicles to provide means for driving machinery or for moving the tractor or for both purposes coincidently.

One of the objects of the invention is to provide mechanism which may be under convenient control for coincidently moving the vehicle and actuating the machinery.

Another object is to provide means for controlling the speed of the driving mechanism independently of the speed of the vehicle, said driving mechanism being of particular advantage for use in connection with the trench machine described in U. S. Letters Patent No. 1,541,818 dated June 16, 1925.

With the foregoing objects in view and others to be mentioned hereinafter, the invention presents a new and useful construction, combination and arrangement of parts as described herein and claimed and as illustrated in the accompanying drawings wherein,—

Fig. 1 is a plan view, partly in section of the power mechanism.

Fig. 2 is a side view of the same, parts being broken away and in section.

Fig. 3 is an enlarged sectional detail relating to Fig. 2.

Fig. 4 is a view showing a hollow worm shaft or sleeve receiving the drive shaft, the latter being in section, a worm gear wheel being added.

The invention is shown and described in connection with the frame 5 and rear axle 6 for the tractor wheels 7 of a tractor, the engine therefor being indicated at 8.

At 9 is indicated a drive shaft actuated by the engine, said shaft having bearings in a hollow worm-shaft or sleeve 10 for a part of its length and having bearings near its rear end in a hanger 11 and upon its rear end is mounted a miter gear wheel 12.

At 13 is indicated a transverse shaft having bearings in a hanger 14 and provided with a miter gear wheel 15 engaging the gear wheel 12, and also provided with a pair of sprocket wheels 16 and 16'.

Upon the rear axle near one of its ends is mounted a sleeve 17, and upon this sleeve are journalled a sprocket wheel 18 and drum 19; and upon said axle near its opposite end are journalled a sprocket wheel 20 and a drum 21. A sprocket chain 22 engages the wheels 16 and 18, and a sprocket chain 23 engages the wheels 16' and 20.

As thus described, rotation of the drive shaft will cause rotation of the transverse shaft 13 for rotating the sprocket wheels 18 and 20. A pair of suitable clutches 23 and 23' are provided, these being shown in broken lines between the drums and a sprocket wheel adjacent thereto, and it will be understood that by means or use of said clutches a rotatable movement of said sprocket wheels 18 and 20 will cause a corresponding rotation of the drums.

It will be understood that the drums 19 and 21 may be rotated for any useful purpose. However, they are used in connection with other mechanism described in said Letters Patent 1,541,818 for the trench machine mentioned, and a description thereof is not considered to be necessary.

In order that the tractor may be moved the hollow worm-shaft or sleeve 10 is provided with a clutch-member 24 adapted to receive a clutch-member 25, the latter being keyed on the drive shaft 9 and adapted to have slidable movements thereon by means of a lever 26, and it will be understood that the hollow worm-shaft or sleeve will be rotated by the drive shaft if the clutch member 25 is moved into engagement with the clutch-member 24.

Numeral 27 indicates a suitable casing for containing an operating shaft 28 and its worm gear-wheel 29 which engages the worm. Upon the ends of the shaft 28 is mounted a pair of sprocket wheels 30 engaged by the sprocket chains 31 carried by the sprocket wheels 30' which are mounted on the rear axle 6 for propelling the tractor.

In operating a trench filler it, obviously would be a great advantage to control the speed of the tractor during operation so that it will move slowly, for otherwise it would be necessary to move the tractor at intervals, depending upon the quantity of loose earth to be moved into the trench.

In order that the tractor may be moved at various degrees of speed by the rotation of the drive-shaft the clutch member 24 is provided with a ring gear 32 adapted to be engaged by the pinion 33 of a control-shaft 34 which has bearings in a hanger 35 and in the hanger 11.

Upon the control-shaft 34 is mounted a pair of gear whels 36 and 37 differing in diameter. Upon the drive shaft 9 is also mounted a pair of gear wheels 38 and 39 which differ in diameter, these being keyed on said shaft and adapted to have sliding movements thereon by use of a lever 40.

Numeral 41 indicates a lever engaging the gear wheel 33 or engaging in the groove of its hub, and by use of the lever 41 the wheel 33 may have sliding movements and may be disengaged from the ring gear 32.

If a comparatively slow movement is desired for the tractor, while the drums are rotating, an operator, by use of the lever 40 may move the gear wheels 38 and 39 forwardly to cause the gear wheel 38 of the drive shaft to engage the gear wheel 36 of the control-shaft, the pinion 33 being in engagement with the gear 32, the clutch member 25, of course, being disengaged from the clutch-member 24.

Also, as is obvious if, by use of the lever 40, the gear wheel 39 is moved into engagement with the gear wheel 37 the speed of the tractor may be reduced.

It will be understood, in the operation of filling trenches, that the loose earth to be moved may be very heavy on account of moisture or may be, comparatively of light weight, and since, by use of the present invention, the tractor may be moving during the operation of filling the trenches, it is desirable to control the speed of the tractor.

The type of vehicle illustrated may be equipped with any type of motor 8 including a clutch operating pedal 42, as shown in Figure 1, the motor unit in its specific embodiment being illustrated in a conventional manner only as it does not affect the invention.

The particular advantage to be derived by use of the invention is the fact that the tractor may be moved at a very limited speed during the operation of filling a trench or while performing other work by machinery (not shown), said machinery being actuated by the rotatable drive-shaft 9. Other advantages derived include the journalled drive shaft within the hollow sleeve and the means for rotating the worm and propelling devices for the tractor, the arrangement of parts shown being such that they occupy a very limited space on the front part of a tractor, and therefore reserving an adequate space on the rear part of the tractor for any suitable or required operating mechanism (not shown) on the rear part of the tractor.

A suitable annular brake band 43 may be employed if desired placed around the clutch member 24 and having a suitable support and a hand lever (not shown). These parts being useful for stopping the rotation of the clutch at desired times.

I claim as my invention,—

In combination with a motor vehicle having an engine therein, a drive shaft extending from the engine and a hoisting drum on the vehicle connected to the drive shaft for operating the drum and worm freely mounted on the portion of the drive shaft, a change speed connection between the shaft and the worm, and propelling connections between the worm and the wheels of the vehicle for operating the latter.

In testimony whereof, I have affixed my signature.

OMAR R. HUMPHREYS.